(12) United States Patent
Collet et al.

(10) Patent No.: US 8,371,350 B2
(45) Date of Patent: *Feb. 12, 2013

(54) DEVICE FOR CONNECTING A TIRE OF AN AIRCRAFT WHEEL TO A PNEUMATIC UNIT OF THE AIRCRAFT

(75) Inventors: Olivier Collet, Palaiseau (FR);
Jean-Clair Pradier, Houilles (FR);
Bertrand Maes, Vanves (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/100,800

(22) Filed: May 4, 2011

(65) Prior Publication Data
US 2011/0204705 A1     Aug. 25, 2011

Related U.S. Application Data

(63) Continuation of application No. 12/255,303, filed on Oct. 21, 2008, now Pat. No. 7,992,610.

(30) Foreign Application Priority Data

Oct. 23, 2007  (FR) ...................................... 07 07429

(51) Int. Cl.
*B60C 23/10* (2006.01)
(52) U.S. Cl. ........................................ 152/417; 137/522
(58) Field of Classification Search .......... 152/415–417; 137/522–523, 580
See application file for complete search history.

(56) References Cited

U.S. PATENT DOCUMENTS

| 1,801,716 | A |  | 4/1931 | Bowers |
| 1,944,113 | A |  | 1/1934 | Shenton |
| 2,107,405 | A |  | 2/1938 | Williams |
| 2,156,841 | A |  | 5/1939 | Davis |
| 2,177,042 | A |  | 10/1939 | Michael |
| 2,685,906 | A |  | 8/1954 | Williams |
| 2,780,267 | A |  | 2/1957 | Richards et al. |
| 4,685,501 | A |  | 8/1987 | Williams |
| 4,700,763 | A |  | 10/1987 | Williams |
| 4,726,397 | A |  | 2/1988 | Stich |
| 5,707,186 | A |  | 1/1998 | Gobell et al. |
| 6,085,782 | A |  | 7/2000 | Ott |
| 7,306,020 | B2 | * | 12/2007 | Beverly et al. ................ 152/417 |
| 7,992,610 | B2 | * | 8/2011 | Collet et al. .................. 152/417 |

FOREIGN PATENT DOCUMENTS

GB          1031726 A        6/1966

* cited by examiner

*Primary Examiner* — Jason Bellinger
(74) *Attorney, Agent, or Firm* — Sughrue Mion, PLLC

(57) ABSTRACT

A device for selectively connecting a tire to a pneumatic unit of an aircraft, the tire forming part of a wheel mounted to rotate on a hollow axle of the aircraft, the device comprising a stator and a rotor that is mounted to rotate relative to the stator and that includes a structure enabling it to be rotated by the wheel. The stator is bell-shaped and is designed to be received as a push-fit in the axle, and includes an end wall carrying a first pneumatic port for connection to the pneumatic unit via a tube running along the inside of the axle, the rotor extending substantially inside the stator.

10 Claims, 2 Drawing Sheets

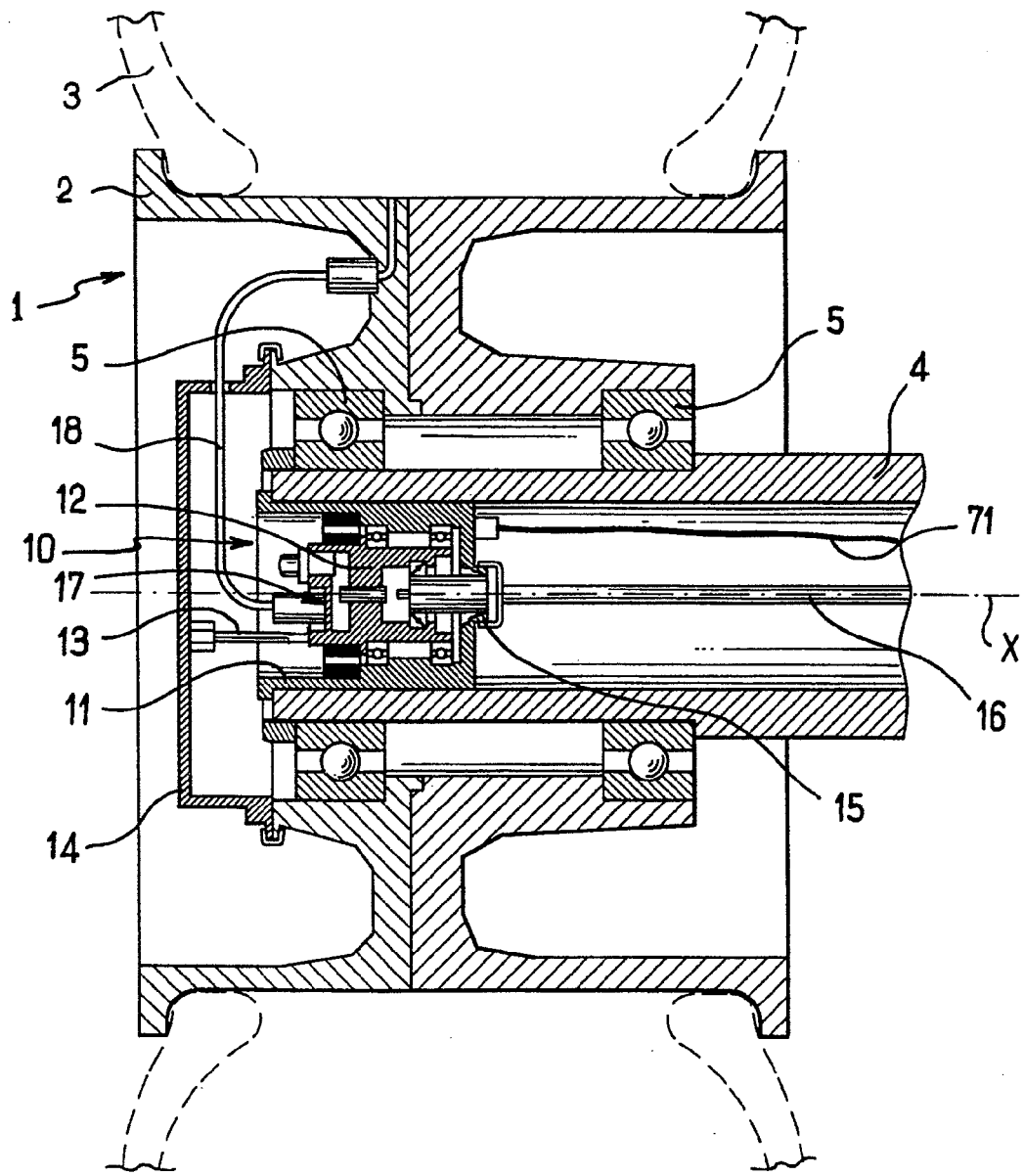

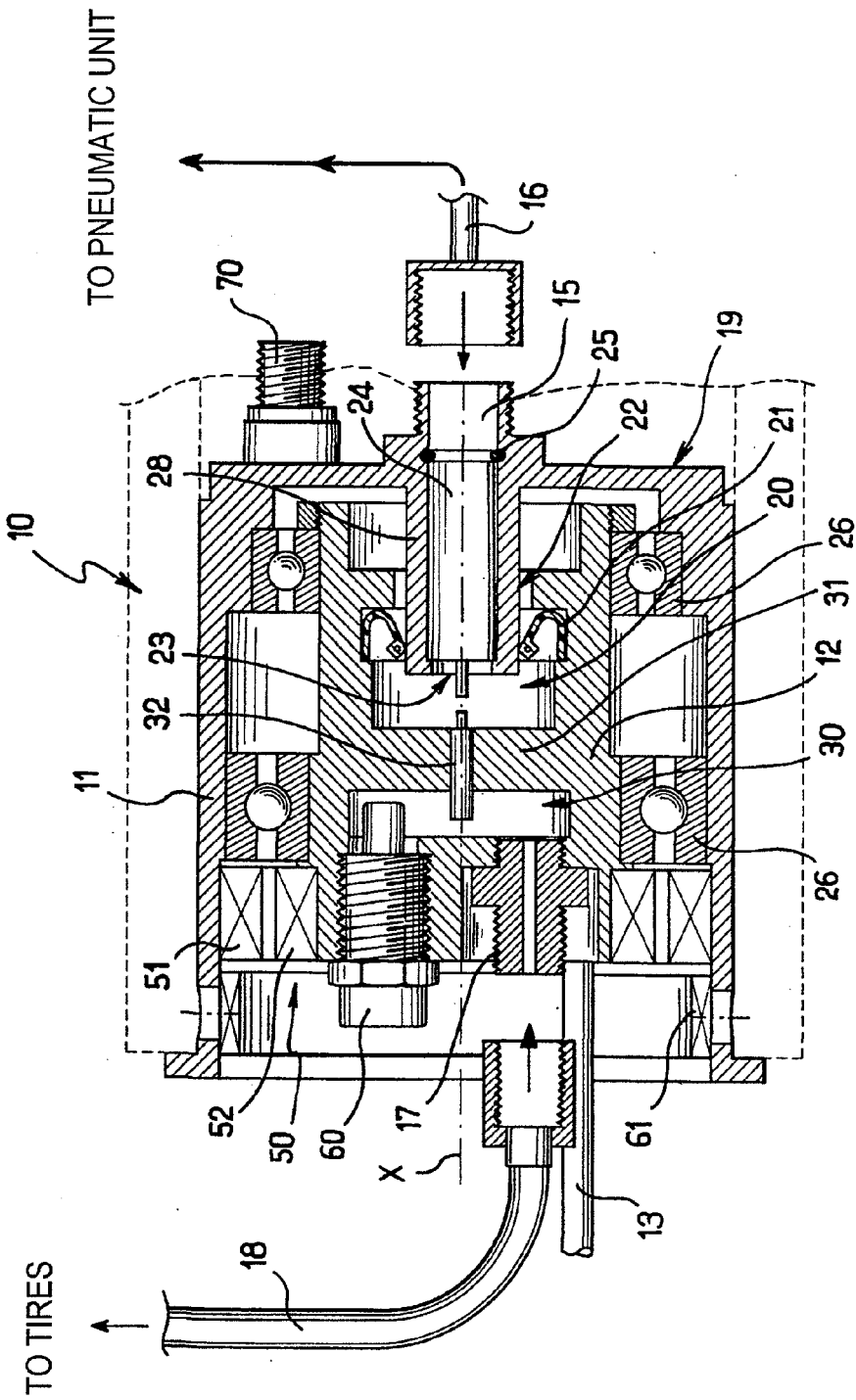

DEVICE FOR CONNECTING A TIRE OF AN AIRCRAFT WHEEL TO A PNEUMATIC UNIT OF THE AIRCRAFT

CROSS-REFERENCE TO RELATED APPLICATIONS

This application is a Continuation Application of U.S. application Ser. No. 12/255,303 filed Oct. 21, 2008 and issued as U.S. Pat. No. 7,992,610, and claims priority from French Patent Application No. 07 07429, filed on Oct. 23, 2007 the entire disclosure of the prior applications are considered part of the disclosure of the accompanying continuation application and is hereby incorporated by reference.

The invention relates to a device for connecting a tire of an aircraft wheel to a pneumatic unit of the aircraft.

BACKGROUND OF THE INVENTION

Aircraft are known that include devices for connecting the tires of wheels to an on-board pneumatic unit. The unit may be an air compressor, a nitrogen generator, or any other system enabling gas to be delivered under a pressure suitable for inflating the tires. Depending on whether the pressure made available by the pneumatic unit is greater than or less than the pressure that exists in the tire, the tire will inflate or deflate. When the aircraft is on the ground, the pneumatic unit can be connected to an external source of pressure.

Document GB 1 031 726 illustrates such a device, having some of its elements outside the axle. In particular, the wheel is fitted with a protective cover that covers the end of the axle and that receives an isolation valve of the tire. That disposition of the valve makes it sensitive to external impacts.

Furthermore, the valve is actuated by a needle that is movable in an axial orifice of the axle. That type of device is not suitable for modern aircraft that usually have axles that are hollow. In addition, it includes a plurality of parts that are separately removable (the needle in the axle, the valve in the wheel cover), which does not facilitate maintenance thereof.

Document U.S. Pat. No. 2,107,405 and U.S. Pat. No. 2,685,906 disclose other devices, more particularly adapted to land vehicles. In particular, the device shown in document U.S. Pat. No. 2,685,906, which is in accordance with the introductory portion of claim 1, is found to be advantageous in that it is entirely modular and can be removed as a whole, naturally providing the gas connections are disconnected. Nevertheless, that device projects from the wheel and is therefore exposed to impacts.

OBJECT OF THE INVENTION

An object of the invention is to provide a device for adjusting the pressure in a tire forming part of an aircraft wheel, based on the device of document U.S. Pat. No. 2,685,906, but better protected.

BRIEF DESCRIPTION OF THE INVENTION

According to the invention, there is provided a device for selectively connecting a tire to a pneumatic unit of an aircraft, the tire forming part of a wheel mounted to rotate on a hollow axle of the aircraft, the device comprising:

a stator and a rotor mounted to rotate relative to the stator about an axis that coincides, in operation, with the axis of rotation of the wheel, and including means for enabling the wheel to drive it in rotation;

a seal that extends between the rotor and the stator to close a first chamber extending between the rotor and the stator and into which a first pneumatic port opens out, the port being carried by the stator for connecting the device to the pneumatic unit;

the rotor defining a second chamber into which a second pneumatic port opens out for connecting the device to the tire;

the rotor carrying a valve extending through a wall of the rotor separating the first and second chambers, thereby enabling the two chambers to be put selectively into pneumatic communication by opening the valve; and the stator carrying an actuator that acts selectively on the valve in order to switch between a stable closed state and an open state.

According to the invention, the stator is bell-shaped, being designed to be received as a push-fit in the axle and having an end wall that carries the first pneumatic port for connection to the pneumatic unit by a pipe running inside the axle, the rotor extending substantially inside the stator.

Thus, the entire device is housed in the axle where it is protected from impacts. Furthermore, the disposition of the first port in the end wall makes it easier to connect the device to the pneumatic unit via a pipe running along the inside of the axle.

Preferably, the actuator is of the electromechanical type. Thus, using an electromechanical actuator enables the actuator to be incorporated completely within the first chamber, without any need to provide an actuator chamber in the stator or an additional pneumatic port for activating the actuator. The gas under pressure coming from the pneumatic unit can flow from the first port towards the open valve by passing through the electromechanical actuator. Nevertheless, the gas will reach the tire only if the valve is open, i.e. only if the actuator is activated.

BRIEF DESCRIPTION OF THE DRAWINGS

The invention can be better understood in the light of the following description with reference to the figures of the accompanying drawings, in which:

FIG. 1 is a section view of a wheel mounted on an aircraft axle that is fitted with a device constituting a particular embodiment of the invention; and FIG. 2 is a section view on a larger scale of the device shown in FIG. 1.

DETAILED DESCRIPTION OF THE INVENTION

With reference to FIG. 1, the device of the invention is shown in place on an aircraft fitted with a pneumatic generator, e.g. a compressor that receives nitrogen from an air separator system that sends the oxygen from the air to an oxygen circuit of the aircraft and the nitrogen from the air to the compressor. The aircraft has at least one wheel 1 comprising a rim 2 that carries a tire 3 and that is received to rotate about an axis of rotation X on a hollow axle 4, by means of ball bearings 5. The device 10 of the invention is placed in the axle 4 at the end thereof and comprises a stator 11 engaged as a push-fit in the axle 4 and fastened thereto by fastener means (not shown). The device 10 further comprises a rotor 12 rotatably mounted in the stator 11. The device 10 is described in greater detail below with reference to FIG. 2. At this point it suffices to observe that the rotor 12 is caused to rotate together with the wheel by means of a finger 13 that extends to co-operate with a protective cap 14 secured to the wheel 1.

With reference to FIG. 2, it can be seen that the stator 11 is generally bell-shaped and is designed to be engaged as a push-fit in the axle, which is drawn in dashed lines, being received almost entirely therein with the exception of an end collar that comes into abutment against the end of the axle. The stator 11 has an end wall 19 that carries a first pneumatic port 15 for connecting the device to the pneumatic unit of the aircraft, by means of a pipe 16 extending along the axle 4. The rotor 12 is completely received within the stator and it is mounted to rotate inside the stator 11 by means of ball bearings 26. The rotor 12 carries a second pneumatic port 17 for connecting the device to the tire via a pipe 18 that extends between the rotor 12 and the rim 2.

The assembly is particularly compact and is incorporated fully within the axle, thereby protecting it against any external impact.

Together the stator 11 and the rotor 12 define a first chamber 20 that is closed by a lip seal 21 that is carried by the rotor 12 to co-operate with a cylindrical bearing surface 22 formed by the outside wall of an axial protrusion 28 of the stator 11 extending inside the rotor 12. The axial protrusion 28 defines an axial housing 23 that opens into the first chamber 20 and within which an oblong electromechanical actuator 24 is engaged, the actuator being stopped axially by a ring 25. The first pneumatic port 15 opens out into the housing 23 and thus into the first chamber 20, given that the actuator 24 is permeable to gas and therefore does not constitute an obstacle to the passage thereof. The actuator 24 extends along the axis X in this embodiment and it possesses a terminal actuator member that is movable along said axis X.

Furthermore, the rotor 12 defines a second chamber 30 into which the second pneumatic port 17 opens out. The second chamber 30 is separated from the first chamber 20 by a wall 31 having a valve 32 passing therethrough along the axis of rotation X. The valve is normally closed, thereby isolating the two chambers from each other. However, it can be opened by the actuator member of the actuator 14 that pushes the stem of the valve 32 so as to open the valve and put the two chambers 20, 30 into pneumatic communication with each other.

In order to modify the pressure in the tire, it is appropriate to put the tire into communication with the pneumatic unit. To do this, the actuator 24 is actuated in such a manner as to open the valve 32 and put the chambers 20 and 30 into communication with each other, which chambers are connected respectively to the pneumatic unit and to the tire. The valve 32 is then left open for a length of time that is sufficient to enable the desired pressure to be established in the tire.

These operations of modifying pressure are normally performed only while the aircraft is in flight or while the aircraft is stationary on the ground. Under such conditions, the lip seal 21 is subjected to pressure only while the wheel is not revolving. This makes it easier for the lip seal 21 to be leaktight. Nevertheless, if a small leak does appear via the lip seal 21, it suffices that the leakage flow rate is well below the inflation flow rate to ensure that the tire is nevertheless inflated. In a variant, it is possible to use any other type of sealing gasket, that is compatible with rotation, and that is capable of providing gastightness, at least while the wheel is not revolving.

The use of an electromechanical actuator makes it possible to avoid providing a second pneumatic source for controlling the actuator, as in the embodiment shown in FIG. 5 of document U.S. Pat. No. 2,685,906. It would be difficult to arrange two pneumatic pipes in the axle. Furthermore, the actuator can be located fully within the first chamber as in the first embodiment shown in FIG. 4 of that document, while nevertheless enabling the actuator to be controlled separately and pressure to be raised by the pneumatic unit, which is not possible in the embodiment of that FIG. 4.

The configuration of the device of the invention also makes it easy to incorporate a wheel revolution sensor since the rotor 12 is constrained to rotate with the wheel. Thus, a tachometer 50 is disposed in the device of the invention, having a stationary portion 51 secured to the stator 11 and a rotary portion 52 secured to the rotor 12 and extending in register with the stationary portion 51 so as to interact remotely therewith by electromagnetic means. In known manner, the electromagnetic interaction generates an electrical current in the stationary portion 51 that is proportional to the speed of rotation of the rotor 12 and thus of the wheel. It then suffices to measure the current flowing in the stationary portion 51 in order to determine the speed of rotation of the wheel.

Furthermore, the configuration of the device of the invention also makes it easy to incorporate a tire pressure sensor. Thus, a pressure sensor 60 is disposed on the rotor 12 to measure the pressure that exists in the second chamber 30, and thus in the tire, since the second chamber 30 is in pneumatic connection with the tire. The pressure sensor 60 is of the radiofrequency type and it receives its electrical energy from an antenna 61 placed on the stator 11 so as to be in a position to interact remotely by electromagnetic means with the pressure sensor 60, regardless of the angular position of the rotor 12. In return, the pressure sensor 60 influences the impedance of the antenna 61 as a function of the pressure in the chamber 12. It then suffices to measure the current flowing in the antenna 60 to determine the pressure in the tire, or to measure any other electrical magnitude (voltage, impedance, . . . ) relating to the antenna 60 and varying with pressure. The pressure sensor arranged in this way replaces the sensor that is usually placed directly on the wheel rim.

The sensors incorporated in the device of the invention are thus particularly well protected against external impacts.

The stationary portion 51 of the tachometer 50, the antenna 61, and the actuator 24 are all electrically connected to the aircraft by means of an electrical connector 70 that also extends from the end wall 19 of the stator 11, and by means of an electric cable 71 likewise running along the axle 4.

The invention is not limited to the above description, but on the contrary covers any variant coming within the ambit defined by the claims.

In particular, although there is shown a device having a rotor that is housed in full within the stator, it is possible, without going beyond the invention, to provide a rotor that projects a little from the stator, e.g. through the second pneumatic port that may project from the end of the stator.

What is claimed is:

1. A device for selectively connecting a tire to a pneumatic unit of an aircraft, the tire forming part of a wheel mounted to rotate on a hollow axle of the aircraft, the device comprising:
   a stator;
   a rotor mounted on the stator in order to be completely received within the stator so that the rotor and the stator may be removed as a unit, the rotor being mounted to rotate inside the stator, by means of a bearing thereon, about an axis that coincides, in operation, with an axis of rotation of the wheel, and including a mechanical coupling between the wheel and rotor for enabling the wheel to drive said rotor in rotation;
   a seal that extends between the rotor and the stator to close a first chamber extending between the rotor and the stator and into which a first pneumatic port opens, the port being carried by the stator for connecting the device to the pneumatic unit;

the rotor defining a second chamber into which a second pneumatic port opens for connecting the device to the tire;

the rotor carrying a valve extending through a wall of the rotor separating the first and second chambers, thereby enabling the two chambers to be put selectively into pneumatic communication by opening the valve; and the stator carrying an actuator that acts selectively on the valve in order to switch between a closed state and an open state, the valve being normally closed;

wherein the stator is bell-shaped and adapted to be push-fit in the axle and having an end wall that carries the first pneumatic port for connection to the pneumatic unit by a pipe running inside the axle, the rotor extending substantially inside the stator.

2. A device for selectively connecting a tire to a pneumatic unit of an aircraft, the tire forming part of a wheel mounted to rotate on a hollow axle of the aircraft, the device comprising:

a stator;

a rotor mounted on the stator thereon about an axis that coincides, in operation, with an axis of rotation of the wheel, and including a coupling between the wheel and rotor for enabling the wheel to drive said rotor in rotation;

a seal that extends between the rotor and the stator to close a first chamber extending between the rotor and the stator and into which a first pneumatic port opens, the port being carried by the stator for connecting the device to the pneumatic unit;

the rotor defining a second chamber into which a second pneumatic port opens for connecting the device to the tire;

the rotor carrying a valve extending through a wall of the rotor separating the first and second chambers, thereby enabling the two chambers to be put selectively into pneumatic communication by opening the valve; and the stator carrying an actuator that acts selectively on the valve in order to switch between a closed state and an open state, the valve being normally closed;

wherein the stator is bell-shaped and adapted to be push-fit in the axle and having an end wall that carries the first pneumatic port for connection to the pneumatic unit by a pipe running inside the axle, the rotor extending substantially inside the stator, and wherein the seal is a lip seal extending between the rotor and a cylindrical bearing surface forming formed on an outer wall of an axial protrusion of the stator disposed inside the rotor.

3. A device according to claim 2, wherein the axial protrusion defines an axial housing that opens into the first chamber and that receives the actuator.

4. A device according to claim 3, wherein the first pneumatic port is disposed axially to open into the axial housing.

5. A device according to claim 1, wherein the actuator is of the electromechanical type.

6. A device according to claim 1, wherein the device includes a tachometer having a stationary portion carried by the stator and a rotary portion carried by the rotor.

7. A device according to claim 1, wherein the device includes a pressure sensor disposed on the rotor to measure the pressure that exists in the second chamber.

8. A device according to claim 2, wherein the actuator is of the electromechanical type.

9. A device according to claim 2, wherein the device includes a tachometer having a stationary portion carried by the stator and a rotary portion carried by the rotor.

10. A device according to claim 2, wherein the device includes a pressure sensor disposed on the rotor to measure the pressure that exists in the second chamber.

* * * * *